(12) United States Patent
Tada et al.

(10) Patent No.: US 9,002,383 B2
(45) Date of Patent: Apr. 7, 2015

(54) INFORMATION PROCESSING SYSTEM, MOBILE INFORMATION TERMINAL, SERVER, AND INFORMATION PROCESSING METHOD

(75) Inventors: Koji Tada, Tokyo (JP); Shingo Yamashita, Tottori (JP)

(73) Assignees: Sony Corporation, Tokyo (JP); Sony Corporation Entertainment Inc., Tokyo (JP)

( * ) Notice: Subject to any disclaimer, the term of this patent is extended or adjusted under 35 U.S.C. 154(b) by 161 days.

(21) Appl. No.: 13/607,927

(22) Filed: Sep. 10, 2012

(65) Prior Publication Data

US 2013/0065616 A1  Mar. 14, 2013

(30) Foreign Application Priority Data

Sep. 13, 2011  (JP) ................................. 2011-199886

(51) Int. Cl.
*H04W 74/00* (2009.01)
*H04W 4/02* (2009.01)

(52) U.S. Cl.
CPC ........................................ *H04W 4/02* (2013.01)

(58) Field of Classification Search
CPC ................................... H04W 4/02; H04W 4/18
USPC ............. 455/456.3, 414.2, 412.1, 456.1–457, 455/414.1–414.3, 517–519
See application file for complete search history.

(56) References Cited

U.S. PATENT DOCUMENTS

| | | | |
|---|---|---|---|
| 6,947,761 B2 * | 9/2005 | Hutcheson et al. ............ 455/518 |
| 7,035,653 B2 * | 4/2006 | Simon et al. .................. 455/466 |
| 7,203,502 B2 * | 4/2007 | Wilson et al. ............... 455/456.2 |
| 7,460,863 B2 * | 12/2008 | Steelberg et al. ............. 455/419 |
| 8,284,748 B2 * | 10/2012 | Borghei ........................ 370/338 |
| 8,401,903 B2 * | 3/2013 | Lerman et al. ............. 705/14.73 |
| 8,655,376 B2 * | 2/2014 | Kaido et al. ................ 455/456.1 |
| 8,660,541 B1 * | 2/2014 | Beresniewicz et al. .... 455/414.2 |
| 8,688,089 B2 * | 4/2014 | Hartwell ..................... 455/414.3 |
| 8,738,545 B2 * | 5/2014 | Abhyanker ................... 705/325 |
| 2003/0114171 A1 * | 6/2003 | Miyamoto .................... 455/456 |
| 2012/0135756 A1 * | 5/2012 | Rosso et al. .............. 455/456.3 |

(Continued)

FOREIGN PATENT DOCUMENTS

| | | |
|---|---|---|
| EP | 1 096 232 | 5/2001 |
| EP | 1 288 626 | 3/2003 |

(Continued)

OTHER PUBLICATIONS

European Search Report dated Jan. 24, 2013, from corresponding European Application No. 12006345.8.

(Continued)

*Primary Examiner* — Sharad Rampuria
(74) *Attorney, Agent, or Firm* — Katten Muchin Rosenman LLP

(57) ABSTRACT

A task management system includes a game terminal and a server. The game terminal acknowledges user designation of whether positional information indicating a position arbitrarily designated by a user on a map of a scale displayed on the terminal or positional information indicating the current position of the terminal should be added to data that should be stored in the server along with the positional information. The game terminal transmits the data to which user designated positional information is added to the server. The server stores the data transmitted from the game terminal along with the positional information.

10 Claims, 15 Drawing Sheets

(56) References Cited

U.S. PATENT DOCUMENTS

2012/0309425 A1\* 12/2012 El Khayat et al. ......... 455/456.3
2014/0228060 A1\* 8/2014 Abhyanker .................. 455/457

FOREIGN PATENT DOCUMENTS

| EP | 1288626 A2 \* | 3/2003 | ............ G01C 21/34 |
|---|---|---|---|
| JP | 2001-297092 | 10/2001 | |
| JP | 2003-173353 | 6/2003 | |
| JP | 2008-136249 | 6/2008 | |
| JP | 2008-242408 | 10/2008 | |

OTHER PUBLICATIONS

Notification of Reason(s) for Refusal dated Jul. 16, 2013, from corresponding Japanese Application No. 2011-199886.

\* cited by examiner

TASK MANAGEMENT SYSTEM 10

FIG.9

| | TASK TITLE | USER ACCOUNT | SCOUT | ENCOURAGE-MENT |
|---|---|---|---|---|
| | LUNCH AT RESTAURANT | kokekoke_midori | 10 | 3 |
| | SQUAT | mushigazi | 29 | 6 |
| | STUDY ENGLISH | tokageman | 12 | 10 |
| | WATCH DRAMA | hitodama | 36 | 2 |
| | RUNNING | makainoaidoru | 21 | 16 |

SP: 5   RADAR   SEARCH   QUIT

FIG.10

LIST OF TASKS

| No. | | TASK TITLE | DATE AND TIME SET | STATUS OF ACHIEVEMENT |
|---|---|---|---|---|
| 1 | B | DUMP GARBAGE | NOT SPECIFIED | UNACHIEVED |
| 2 | A | SQUAT | 2/18 9:00 | UNACHIEVED |
| 3 | A | STUDY ENGLISH | EVERYDAY | UNACHIEVED |
| 4 | B | WATCH DRAMA | NOT SPECIFIED | UNACHIEVED |
| 5 | A | RUNNING | 2/20 | UNACHIEVED |

NEW   DELETE   SORT   ACHIEVED   CALENDAR

FIG.11

| TASK TYPE | SCORE | SPECIAL BENEFIT | SP | | |
|---|---|---|---|---|---|
| | | | 0~10 | 11~30 | 30~ |
| A | 0 | NONE | — | — | — |
| A | 1~3 | CHARACTER α | LEVEL 1 | LEVEL 2 | LEVEL 3 |
| A | 4~6 | CHARACTER β | LEVEL 1 | LEVEL 2 | LEVEL 3 |
| A | 7~10 | CHARACTER γ | LEVEL 1 | LEVEL 2 | LEVEL 3 |
| B | 0 | NONE | — | — | — |
| B | 1~3 | CHARACTER X | LEVEL 1 | LEVEL 2 | LEVEL 3 |
| B | 4~6 | CHARACTER Y | LEVEL 1 | LEVEL 2 | LEVEL 3 |
| B | 7~10 | CHARACTER Z | LEVEL 1 | LEVEL 2 | LEVEL 3 |

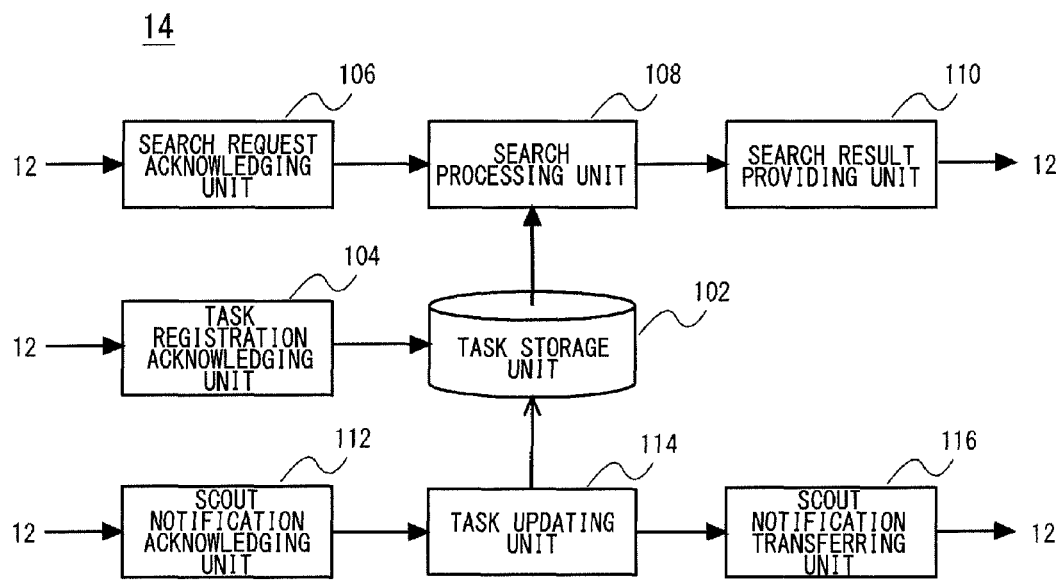

US 9,002,383 B2

INFORMATION PROCESSING SYSTEM, MOBILE INFORMATION TERMINAL, SERVER, AND INFORMATION PROCESSING METHOD

BACKGROUND OF THE INVENTION

1. Field of the Invention

The present invention relates to a data processing technology and, more particularly, to an information processing system, a mobile information terminal, a server, and an information processing method.

2. Description of the Related Art

Various kinds of data such as game-related data to which positional information indicating a specific position on a map is added may be uploaded to a server. Recently, mobile information terminals such as mobile game devices and smartphones have become popular. There are users who communicate with a server on a network using a mobile information terminal.

In comparison with desktop information processing devices, various constraints in hardware resources, communication band, etc. are imposed on mobile information terminals. We are of a view that there has not been sufficient proposal for technology capable of mitigating inconvenience experienced in designating positional information to be added to data.

SUMMARY OF THE INVENTION

The present invention addresses the issue described above and a primary purpose thereof is to provide a technology adapted to mobile information terminals and capable of mitigating inconvenience experienced in designating positional information to be added to data.

The information processing system addressing the above issue comprises a first mobile information terminal and a server. The first mobile information terminal comprises: a current position acquisition unit configured to acquire a current position of the terminal; an acknowledging unit configured to acknowledge user designation of whether positional information indicating a position arbitrarily designated by a user on a scaled map displayed on the terminal or positional information indicating the current position of the terminal acquired by the current position acquisition unit is to be added to data to be stored in the server along with the positional information; and a transmitting unit configured to transmit to the server the data to which user designated positional information is added. The server includes a storage unit configured to store the data transmitted from the first mobile information terminal along with the positional information.

Another embodiment of the present invention relates to a mobile information terminal. The mobile information terminal comprises: a current position acquisition unit configured to acquire a current position of the terminal; an acknowledging unit configured to acknowledge user designation of whether positional information indicating a position arbitrarily designated by a user on a scaled map displayed on the terminal or positional information indicating the current position of the terminal acquired by the current position acquisition unit is to be added to data to be stored in an external server along with the positional information; and a transmitting unit configured to transmit to the server the data to which user designated positional information is added.

Still another embodiment of the present invention relates to a server. The server is adapted to store data along with positional information, and comprises: an acknowledging unit configured to acknowledge, from an external mobile information terminal, data to which is added positional information indicating a position arbitrarily designated by a user on a scaled map displayed on the terminal or positional information indicating the current position of the terminal, according to user selection; and a storage unit configured to store the acknowledged data along with the positional information.

Yet another embodiment of the present invention relates to an information processing method. The information processing method comprises: acquiring, using a mobile information terminal, a current position of the terminal; acknowledging, using the mobile information terminal, user designation of whether positional information indicating a position arbitrarily designated by a user on a scaled map displayed on the terminal or positional information indicating the current position of the terminal is to be added to data to be stored in an external server along with the positional information; and transmitting to the server, using the mobile information terminal, the data to which user designated positional information is added; and storing, using the server, the data transmitted from the mobile information terminal along with the positional information.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 9 shows an interface displayed on the game terminal;

FIG. 10 shows an interface displayed on the game terminal;

FIG. 11 shows conditions for granting a special benefit in the game terminal;

FIG. 13 shows the configuration of task data stored in the task storage unit of FIG. 12;

FIG. 14 is a block diagram of the functional details of the server;

FIG. 15A shows the configuration of task data stored in the task storage unit of FIG. 14;

FIG. 15B show the configuration of task data stored in the task storage unit of FIG. 14;

DETAILED DESCRIPTION OF THE INVENTION

The invention will now be described by reference to the preferred embodiments. This does not intend to limit the scope of the present invention, but to exemplify the invention.

Figure 1:
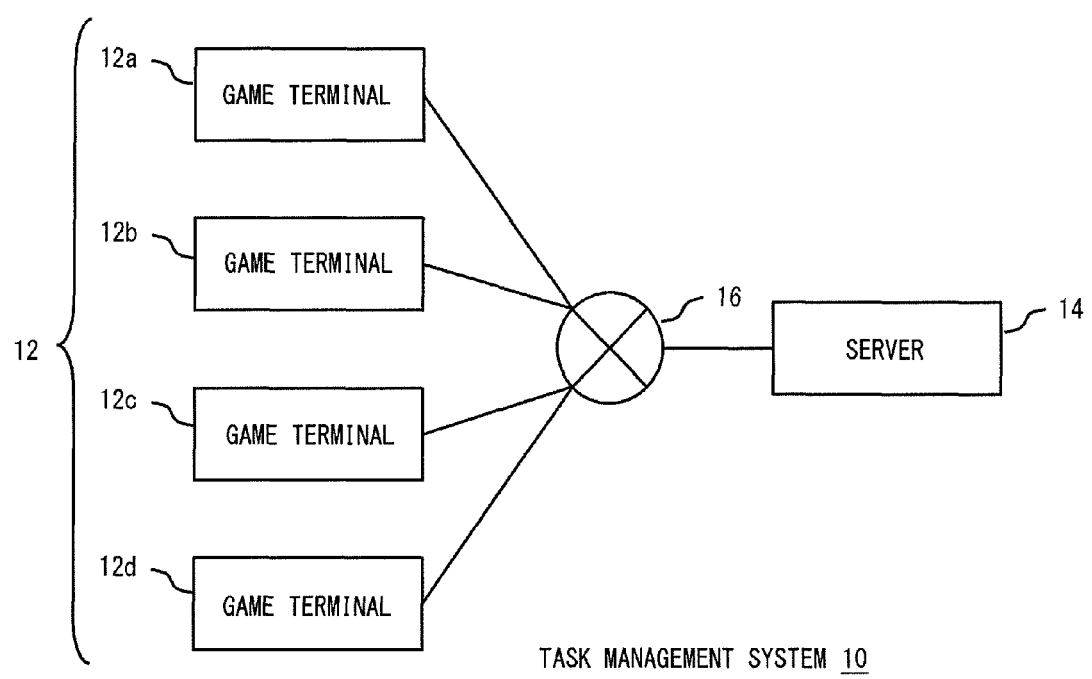
FIG. 1 shows the configuration of a task management system according to an embodiment.

FIG. 1 shows the configuration of a task management system 10 according to an embodiment. The task management system 10 comprises a game terminal 12a, a game terminal 12b, a game terminal 12c, and a game terminal 12d, which are generically referred to as game terminals 12. The task management system 10 also comprises a server 14. These devices are connected to each other by a wired or wireless communication network 16. The communication network 16 ma be a LAN, WAN, the Internet, etc.

The game terminal 12 is a mobile game device held by a user for use. In variations, the game terminal 12 may be a mobile information processing device such as a cell phone, a smartphone, a tablet information terminal, etc. The game terminal 12 manages things (hereinafter, called "tasks") that the user as an operator should keep in mind and that should be executed at a certain point of time. For example, the game terminal 12 manages the status of execution of a task indicating that the task has been executed or the task has not been executed.

A task may be a content of a memorandum, a content of the user's plan (in other words, a schedule to be fulfilled), or a content of the user's habit. For example, a task that should be executed on a particular date and time may be a check of whether a particular article for sale in an auction site is bought. A task that should be repeatedly executed week by week may be a task of recording a serially broadcast drama.

The server 14 mediates exchange of task data between the game terminals 12a-12d. More specifically, the server 14 make a task uploaded from a given game terminal 12 known to another game terminal 12 and causes the other game terminal 12 to download the task in response to a request from the other game terminal 12.

Figure 2:
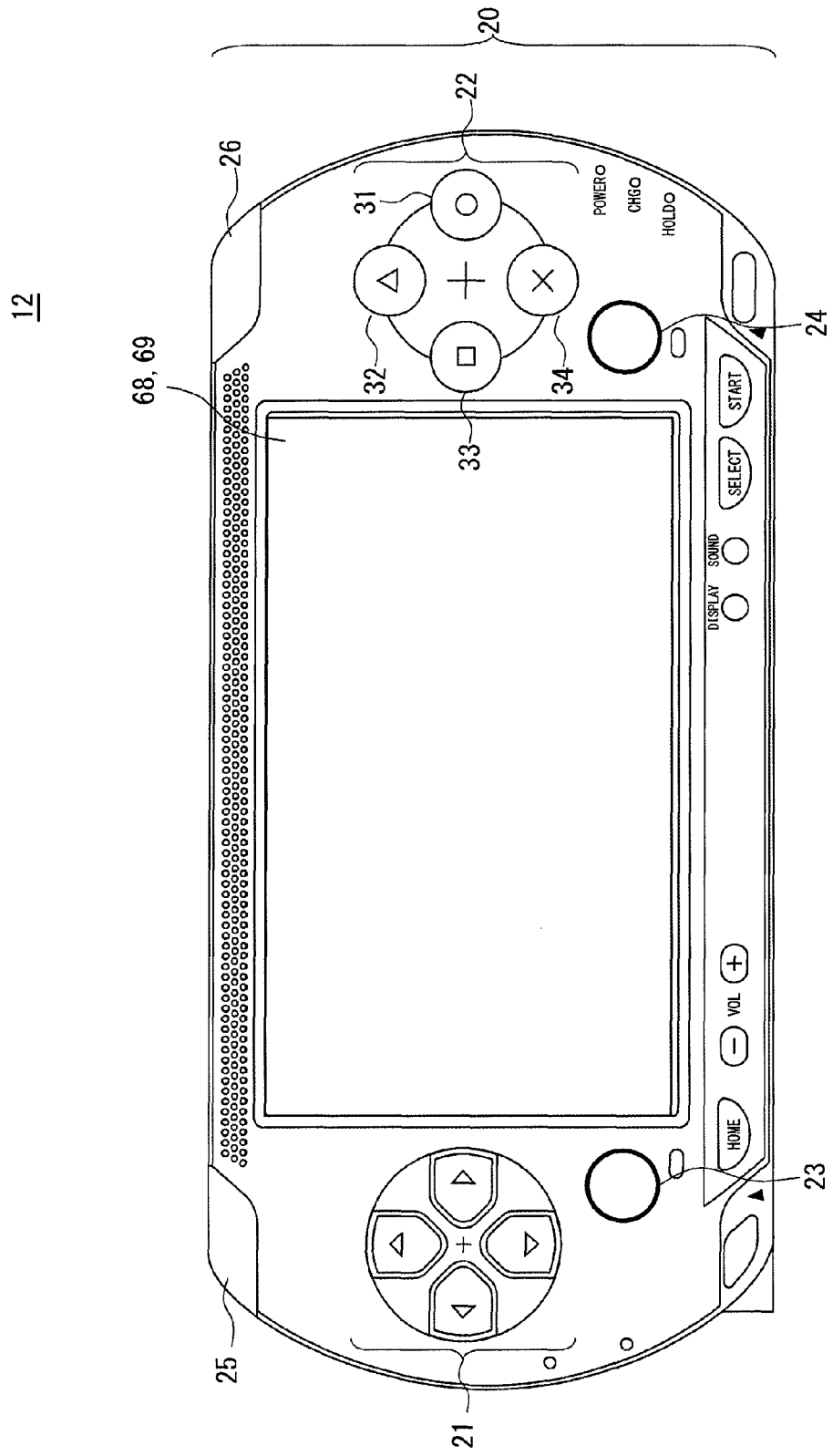
FIG. 2 shows an appearance of the game terminal.

FIG. 2 shows an appearance of the game terminal 12 of FIG. 1. The game terminal 12 is provided with input devices such as a directional key 21, a button 22, a left analog stick 23, a right analog stick 24, a left button 25, a right button 26, etc. The game terminal 12 is also provided with a display device 68. The display is also provided with a touch panel 69 for sensing contact by the player's finger or a stylus pen. The button 22 includes a circle button 31, a triangle button 32, a square button 33, and a cross button 34.

A description will now be given of a user interface displayed on the display device 68 of the game terminal 12 with reference to FIGS. 3-10.

Figure 3:
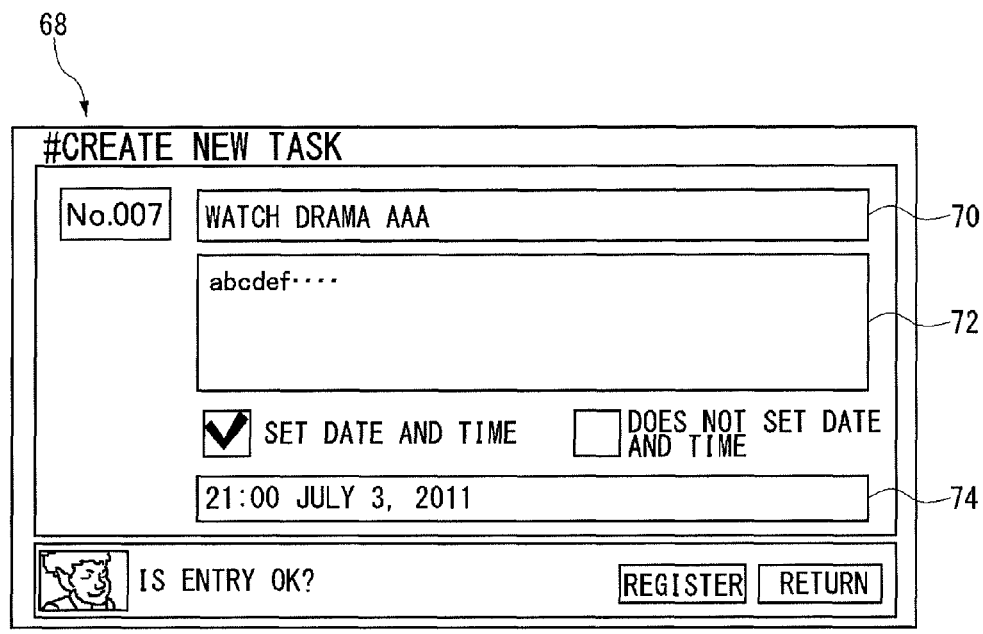
FIG. 3 shows an interface displayed on the game terminal.

A user creates and registers a new task in the game terminal 12. FIG. 3 shows a task creation screen for creating a task. A task title field 70 is a field in which the title of a task is entered. A task comment field 72 is a field in which a desired sentence related to the task is entered by the user. For example, the specific content of the task, the user's opinion/remarks related to the task, etc., are entered. The date and time that the task should be executed is defined in a scheduled execution date and time field 74. The user may define in the scheduled execution date and time field 74 that a task should be repeatedly executed day by day, week by week, or month by month.

Figure 4:
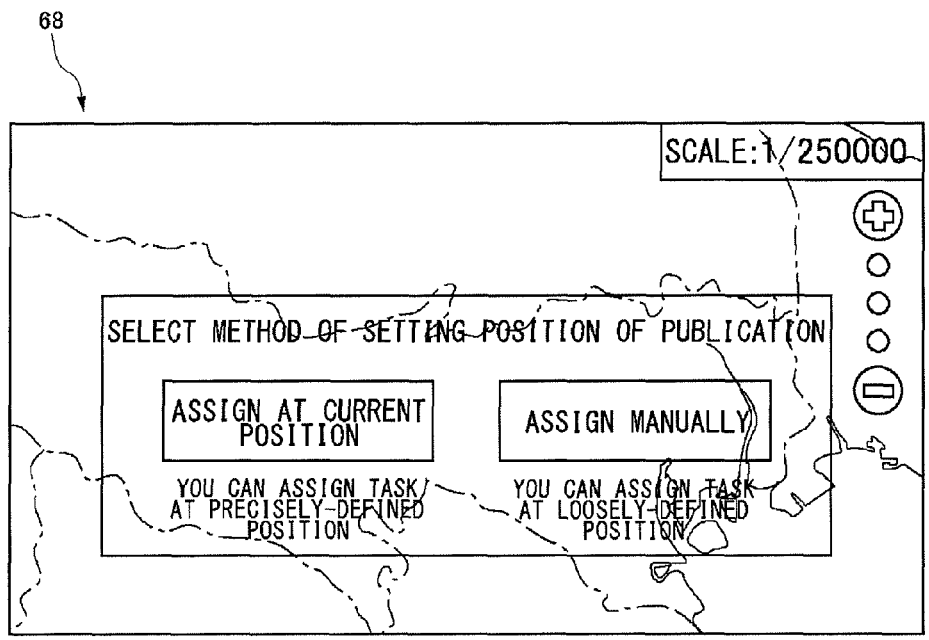
FIG. 4 shows an interface displayed on the game terminal.

The task management system 100 allows a user to publish a task created by the user to other users via the server 14. More specifically, the user assigns a task at a particular position on a map and uploads information on the task to the server 14 along with positional information indicating the position of the task. FIG. 4 shows a screen that allows the user to select a method of assigning a task. As shown in FIG. 4, the user selects whether to assign the task at the current position of the game terminal 12 or a position manually designated on a map image.

Figure 5:
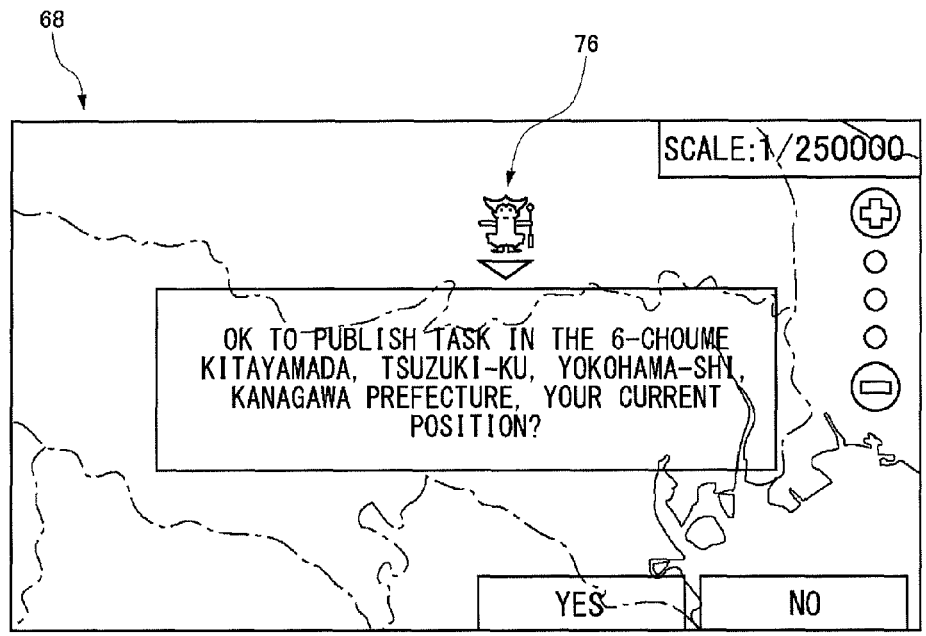
FIG. 5 shows an interface displayed on the game terminal.

FIG. 5 shows a confirmation screen shown when a selection to assign the task at the current position of the game terminal 12 is made in an assignment method selection screen of FIG. 4. The current position of the game terminal 12 is identified at a relatively fine granularity by means of a GPS. Therefore, the address representing the position at which the task is assigned is displayed in the figure at a granularity of towns and blocks (cho and choume (choumoku) in the case of Japan). A position symbol 76 is an image of a symbol indicating the position at which the task is assigned on the map image. In the figure, the position symbol 76 indicates the current position of the game terminal 12 on the map image.

Figure 6:
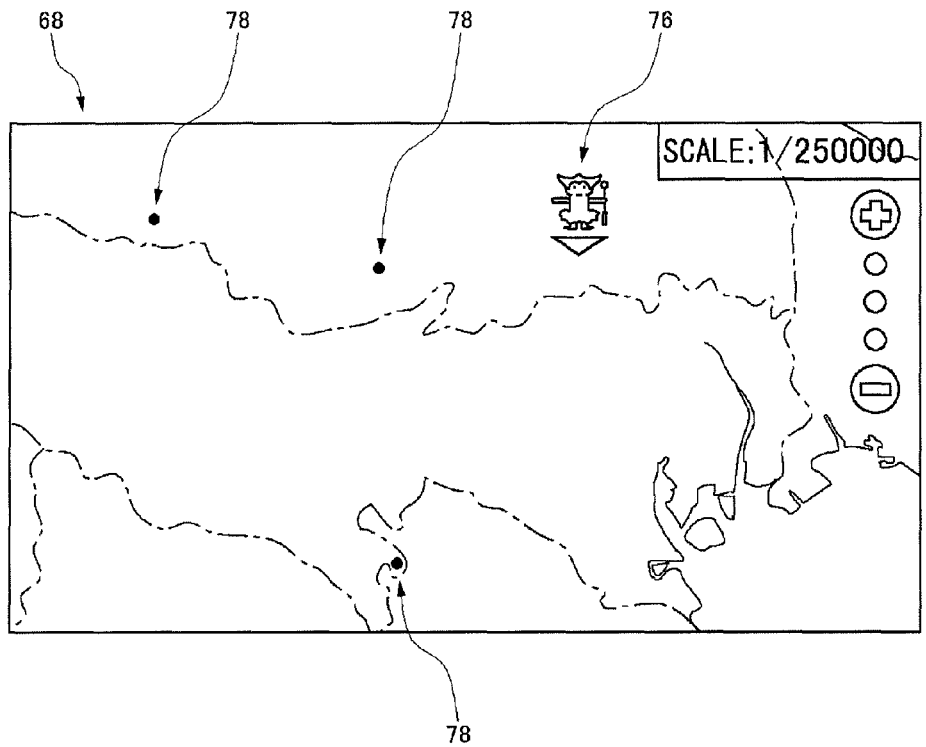
FIG. 6 shows an interface displayed on the game terminal.

FIG. 6 shows an assignment position designation screen shown when a selection to assign a task manually on the map image is made in the assignment method selection screen of FIG. 4. The user taps a desired position on the map image simulating a Japanese map to determine the tap position as a position at which the task is assigned. In this case, the displayed position of the position symbol 76 is moved to the tap position.

Figure 7:
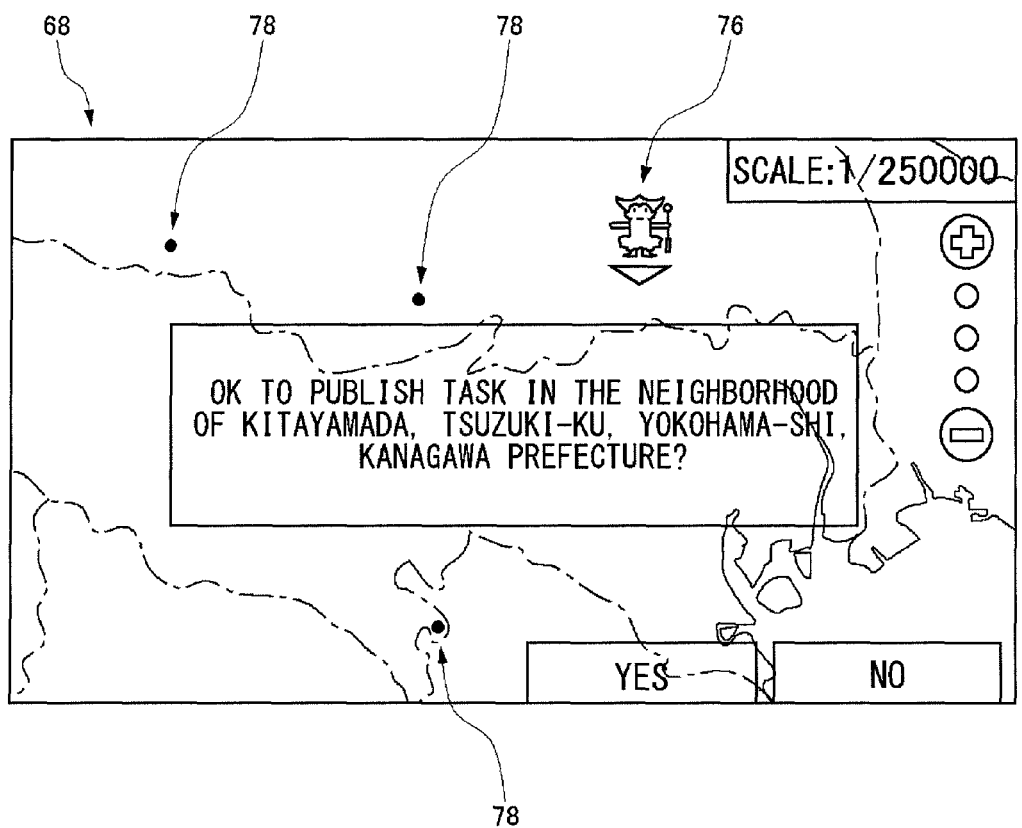
FIG. 7 shows an interface displayed on the game terminal.

FIG. 7 shows a confirmation screen shown when a desired position on the map image is tapped in the assignment position designation screen of FIG. 6. FIG. 7 shows the address representing the position at which the task is assigned at a granularity of cities, wards, towns, and villages.

In the embodiment, the addresses of positions that can be designated by a user in the map image are predefined in the data for the map image. Due to the constraints on system resources such as memories in the game terminal 12, it is difficult for the game terminal 12 to store a map image of a fine scale in a large quantity. It is also difficult to define addresses in the data for a map image at a fine granularity in association with respective positions on a map because this will increase the data volume considerably. By way of example, the finest scale of a map is 1/250000 so that the granularity of a position (address) that can be designated by the user by tapping is restricted to the granularity of cities, wards, towns, and villages. Accordingly, when a desired position on the map image is designated as a position at which the task is assigned, the address representing the position at which the task is assigned is identified by the address information predefined in the data for the map image at a relatively coarse granularity.

Figure 8:
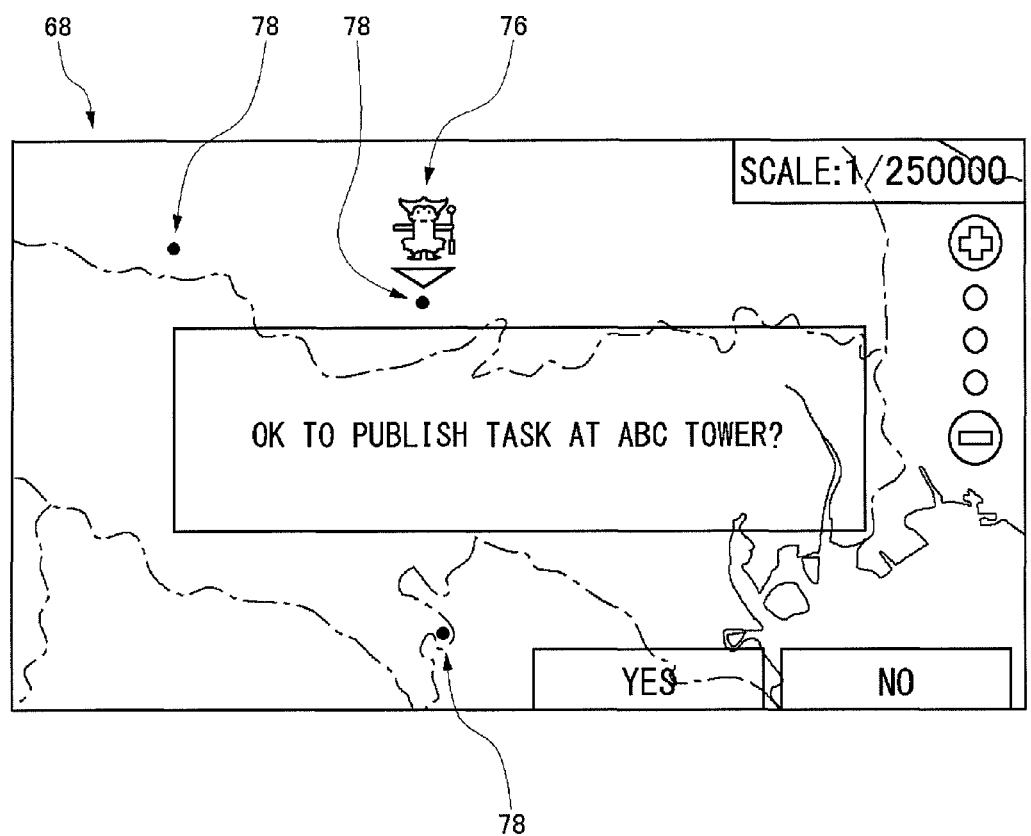
FIG. 8 shows an interface displayed on the game terminal.

Referring back to FIG. 6, the map image includes a landmark symbol 78. The landmark symbol 78 is an image indicating the position of a geographical landmark such as a famous building, a place of interest, a historic site, etc. For example, the landmark symbol 78 indicates "ABC tower" or "XYZ park". Four to six landmark symbols 78 are located per a jurisdiction (To, Do, Fu, and Ken in the case of Japan). The user designates the position of a particular landmark symbol 78 as a position at which the task is assigned by tapping the particular landmark symbol 78. Since the detailed address of each landmark is predefined in the data for the map image, the position at which the task is assigned can be designated at a relatively fine granularity. FIG. 8 shows a confirmation screen shown when a particular landmark on the map image (in this case, ABC tower) is designated in the assignment position designation screen of FIG. 6.

A landmark need not necessarily be located in a map image. For example, a landmark may be displayed in a display area separate from the map image in a mode that user designation is enabled.

According to the task management system 10, the user of the game terminal 12 can import a task published by another user as a task of the importing user via the server 14. FIG. 9 shows a screen showing a list (hereinafter, "neighborhood task list") of tasks (hereinafter, "neighborhood tasks") published (i.e., assigned) at positions in the neighborhood of the current position of the game terminal 12. A neighborhood task list can be said to show the result of retrieving neighborhood task from a plurality of tasks published by other users.

A task title field 80 of the neighborhood task list contains the title of a task. A user account field 82 contains the account of the publishing user (i.e., the creator) who publishes the task. A scout count field 84 contains the frequency that the task is imported by users other than the publisher user, i.e., the number of users who imported the task as the task of the importing user. An encouragement count field 86 contains the number of times that the task invites encouragement by users other than the publisher user, i.e., the number of times that the execution of the task is recommended by other users.

An SP field 88 contains an indicator indicating a social point (hereinafter, "SP") possessed by the user of the game terminal 12. FIG. 9 shows that the SP is "5". As described later, the SP increases as the scout count or encouragement count of the task published by the user increases. Also, the more frequent the user imports (scouts) or supports (encourages) tasks published by other users, the larger the value of SP. In other words, SP is an indication of the frequency of interaction of the user with other users.

When the user selects a task that the user wishes to import as the user's own task in the neighborhood task list, a task editing screen similar to that of FIG. 3 is shown to indicate the details of the task (e.g., the comment or scheduled execution date and time, in addition to the title). The user edits the information (e.g., the comment or scheduled execution date and time) on the task selected in the neighborhood task list in accordance with the user's preference or convenience, and stores the edited task as the user's own task.

FIG. 10 shows a screen showing a list of the user's tasks recorded in the game terminal 12 (hereinafter, also referred to as "user task list"). A task type field 90 contains an indicator indicating whether a task is created in the user's own terminal or created in another game terminal 12. The figure marks a task created in the user's terminal (hereinafter, "internally created task") as "A", and marks a task created in another game terminal 12 (hereinafter, "externally created task") as "B". A task title field 92 contains the title of a task, and a scheduled execution date and time field 94 contains the date and time that the task is scheduled to be executed.

A status of achievement field 96 contains an indicator indicating whether the task is not executed (not achieved) or executed (achieved) at the current point of time. The user changes an entry in the status of achievement field 96 of the user task list from "unachieved" to "achieved" when a task is executed. As described later, when an internally created task is achieved, the task achievement score of task type "A" is incremented. When an externally created task is achieved, the task achievement score of task type "B" is incremented.

The game terminal 12 manages the SP of the user, the score of task type "A", and the score of task type "B". A special benefit in the game, and, more specifically, a game character, is provided to the user in accordance with the scores. FIG. 11 shows conditions for granting a special benefit in the game terminal 12. It will be assumed that user benefit is greater in the ascending order of characters α, β, γ and characters X, Y, and Z. It will also be assumed that user benefit is greater in the ascending order of levels 1, 2, and 3. Therefore, the larger the SP of the user, the score of task type "A", and the score of task type "B", the higher the special benefit provided to the user. For example, a character with higher power of attaching enemy characters or a highly rare character may be provided as a friend character of the user. When the score of task type "A" and the score of task type "B" are equal, the score of task type "B" is given preference.

Figure 12:
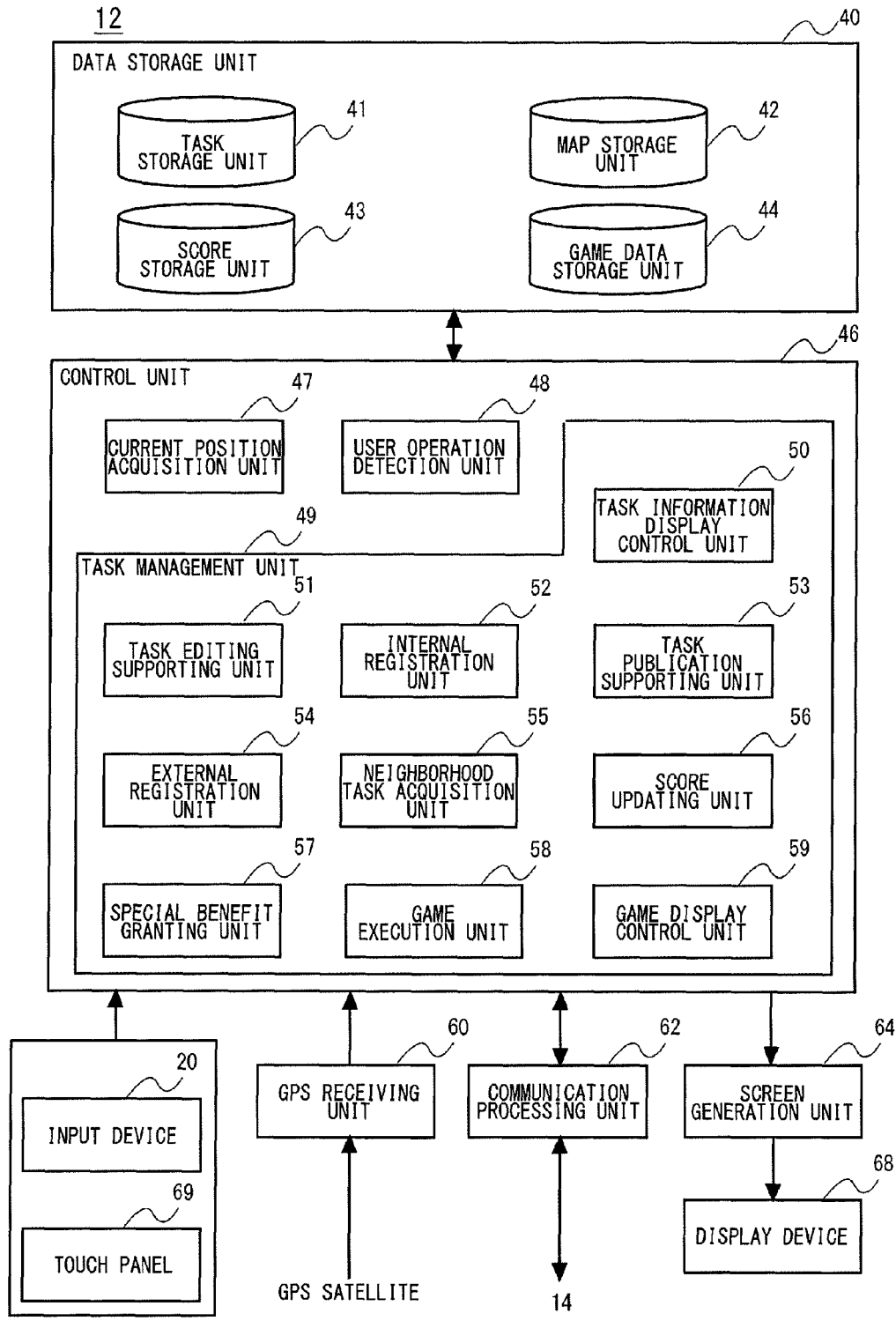
FIG. 12 is a block diagram showing the functional details of the game terminal.

A description will now be given of the configuration of the game terminal 12 and the server 14 in the task management system 10 providing the user interface as described above. FIG. 12 is a block diagram showing the functional details of the game terminal 12. The game terminal 12 comprises an input device 20, a display device 68, a touch panel 69, a GPS receiving unit 60, a communication processing unit 62, a screen generation unit 64, a data storage unit 40, and a control unit 46.

The blocks depicted in the block diagram of this specification are implemented in hardware such as devices or mechanical components such as a CPU of a computer, and in software such as a computer program etc. FIG. 12 depicts functional blocks implemented by the cooperation of these elements. Therefore, it will be obvious to those skilled in the art that the functional blocks may be implemented in a variety of manners by a combination of hardware and software. For example, the functional blocks of the control unit 46 may be implemented by storing corresponding program modules in a storage such as a flash memory, reading the modules into the main memory, and executing the modules by using the CPU. The functional blocks of the data storage unit 40 may be implemented by a storage such as a flash memory or by the main memory.

The GPS receiving unit 60 receives a signal from a GPS satellite and outputs information indicating the current position of the game terminal 12 in accordance with the signal. More specifically, the GPS receiving unit outputs the longitude and latitude indicating the current position of the game terminal 12. The communication processing unit 62 processes communication with an external device such as the server 14 via the communication network 16. The screen generation unit 64 generates data for a task management screen and a game screen controlled by the control unit 46 and displays the task management screen and the game screen on the display device 68.

The data storage unit 40 includes a task storage unit 41, a map storage unit 42, a score storage unit 43, and a game data storage unit 44. The task storage unit 41 stores data for tasks that should be managed in the game terminal 12, i.e., tasks created by the host terminal and tasks created by other game terminals 12 and imported therefrom.

FIG. 13 shows the configuration of task data stored in the task storage unit 41 of FIG. 12. The task data includes a task ID, a user account, a title, a comment, a scheduled execution date and time, and a status of achievement. The task ID is a unique ID in the task management system 10. The user account is a user account of a task creator. The title is a title of a task, the comment is a user comment related to the task, and the scheduled execution date and time is a date and time that the task is scheduled to be executed. The status of achievement is information indicating whether the task is already achieved or not achieved.

Referring back to FIG. 12, the map storage unit 42 stores data of a map image that should be displayed when the user determines whether to make the task public. The data for the map image includes information indicating correspondence between positions of a plurality of points that could be designated by the user in the map image, and addresses at a granularity of cities, wards, towns, and villages. The data further includes information indicating the correspondence between positions of a plurality of landmarks and detailed addresses (addresses at a granularity of towns and blocks, according to the embodiment) of the landmarks.

The score storage unit 43 stores scores for respective user attributes related to grant of special benefits in a game. More specifically, the score storage unit 43 stores the score of SP possessed by the user of the game terminal 12, the task achievement score of task type "A", and the task achievement score of task type "B". The game data storage unit 44 stores data for a game in which the characters α-γ and characters X-Z shown in FIG. 11 present themselves.

According to the embodiment, the scores stored in the score storage unit 43 are periodically cleared when a predetermined period of time (e.g., 24 hours) has elapsed. Therefore, the special benefit granted to the user when a predetermined period of time has elapsed varies depending on the status of achievement of a plurality of tasks, the status of scout and encouragement of the externally created tasks by the user, and the status of scout and encouragement of the internally created tasks by other users during the predetermined period of time.

The control unit 46 includes a current position acquisition unit 47, a user operation detection unit 48, and a task management unit 49. The current position acquisition unit 47 transmits the values of longitude and latitude output by the GPS receiving unit 60 to an external address identification server via the communication processing unit 62. The address identification server receives the values of longitude and latitude and provides information indicating the address identified by the values at a granularity of towns and blocks. The current position acquisition unit 47 acquires the information on the address corresponding to the values of longitude and latitude output by the GPS receiving unit 60 from the address identification server.

The user operation detection unit 48 receives a control signal input via the input device 20 controlled by the user and detects the content of operation. The user operation detection unit 48 also acquires from the touch panel 69 the coordinates of the position where a tap operation or a drag operation by the user is detected. The user operation detection unit 48 delivers information indicating the detected content of operation and information indicating the coordinates of a touched position on the touch panel 69 to the task management unit 49.

The task management unit 49 executes a process of managing tasks that should be executed by the user of the game terminal 12. The task management unit 49 includes a task information display control unit 50, a task editing supporting unit 51, an internal registration unit 52, a task publication supporting unit 53, an external registration unit 54, a neighborhood task acquisition unit 55, a score updating unit 56, a special benefit granting unit 57, a game execution unit 58, and a game display control unit 59. The task management unit 49 may be embodied by a task management application stored in a recording medium, and may be installed in the game terminal 12 via the recording medium.

The task information display control unit 50 acquires the task data stored in the task storage unit 41 and defines it as the data for a user task list. The task information display control unit 50 causes the display device 68 to display the user task list via the screen generation unit 64. When the user account of the task data is the user account of the host terminal, the task information display control unit 50 defines "A" in the task type field 90. When the user account of the task data is the user account of another terminal, the task information display control unit 50 defines "B" in the task type field 90.

When a particular task is selected in the user task list, the task information display control unit 50 acquires the detailed information (e.g., the comment or date and time of execution, in addition to the title) stored in the task storage unit 41 and causes the display device 68 to display the detailed information. When an operation of updating the status of achievement of a particular task from "unachieved" to "achieved" is detected, the task information display control unit 50 updates the status of achievement defined in the task data for the task stored in the task storage unit 41 from "unachieved" to "achieved". In association with this, the task information display control unit 50 also updates the status of display as displayed in the user task list.

The task editing supporting unit 51 causes a task creation screen to be displayed and supports user input of information in the task creation screen. When a registration operation is performed in the task creation screen, the internal registration unit 52 assigns a new task ID to the created task and stores the task ID in the task storage unit 41 along with the task data entered in the task creation screen. In this case, the internal registration unit 52 registers the task as an internally created task by storing the user account of the host terminal of the task creator in the task storage unit 41. The internal registration unit 52 defines the status of achievement as "unachieved".

The task editing supporting unit 51 also causes a task editing screen for editing a task acquired from the server 14 to be displayed and supports user input of information in the task editing screen. When a registration operation is performed in the task editing screen, the internal registration unit 52 stores the task data entered in the task editing screen in the task storage unit 41 along with the task ID acquired from the server 14 as data for the acquired task. In this case, the internal registration unit 52 registers the task as an externally created task by storing the user account of the other terminal acquired as the task data from the server 14 in the task storage unit 41. The internal registration unit 52 defines the status of achievement as "unachieved".

The task publication supporting unit 53 acquires a map image stored in the map storage unit 42 and controls the display of the screens shown in FIGS. 4-8. The task publication supporting unit 53 also executes a process determined by user input in the screens. More specifically, when a user operation indicating a request to publish a particular internally created task is detected, the task publication supporting unit 53 causes the assignment method selection screen of FIG. 4 to be displayed. When a selection is made in the assignment method selection screen to assign the task at the current position of the game terminal 12, the task publication supporting unit 53 acquires positional information indicating the address of the current position of the game terminal 12 from the current position acquisition unit 47 and causes the positional information to be displayed in the assignment position confirmation screen of FIG. 5.

When a selection is made in the assignment method selection screen to assign the task at a manually designated position, the task publication supporting unit 53 causes the assignment position designation screen of FIG. 6 to be displayed. When a particular position on the map image is tapped in the assignment position designation screen, the task publication supporting unit 53 acquires the positional information indicating the address mapped to the tap position from the map storage unit 42 and causes the positional information to be displayed in the assignment position confirmation screen of FIG. 7. When a landmark located in the map image is tapped in the assignment position designation screen, the task publication supporting unit 53 acquires the positional information indicating the address mapped to the landmark from the map storage unit 42 and causes the positional information to be displayed in the assignment position confirmation screen of FIG. 8.

The external registration unit 54 publishes the task to the other users by uploading to the server 14 the data for the task requested by the user to be published. More specifically, when an operation for determination of publication is detected in the assignment position confirmation screen of FIG. 5, the external registration unit 54 transmits a task registration request to the server, the task registration request being produced by adding the positional information indicating the address of the current position of the game terminal 12 at a granularity of towns and blocks to the internally created task designated by the user.

When an operation for determination of publication is detected in the assignment position confirmation screen of FIG. 7, the external registration unit 54 transmits a task registration request to the server 14, the task registration request being produced by adding the positional information indicating the address of the position designated by the user on the map image at a granularity of cities, wards, towns, and villages to the internally created task designated by the user. When an operation for determination of publication is detected in the position confirmation screen of FIG. 8, the external registration unit 54 transmits a task registration request to the server 14, the task registration request being produced by adding the positional information indicating the address of the landmark designated by the user at a granularity of towns and blocks to the internally created task designated by the user.

When an operation of searching for neighborhood tasks is detected, the neighborhood task acquisition unit 55 acquires the positional information indicating the current position of the game terminal 12 from the current position acquisition unit 47. The neighborhood task acquisition unit 55 transmits a request to search for neighborhood tasks, designating the positional information, so as to acquire list information indicating a list of neighborhood tasks from the server 14 and causes the neighborhood task list of FIG. 9 to be displayed. In this process, the neighborhood task acquisition unit 55 also displays the SP of the user stored in the score storage unit 43.

When a particular neighborhood task is selected in the neighborhood task list, the neighborhood task acquisition unit 55 acquires the detailed information (ID, user account, title, comment, scheduled execution date and time, etc.) of the selected neighborhood task from the server 14 and causes the display device 68 to display the detailed information. When the user designates importing (scouting) the neighborhood task, the neighborhood task acquisition unit 55 delivers the detailed information of the neighborhood task to the task editing supporting unit 51 and causes the task editing screen to be displayed. Meanwhile, when the user designates support (encouragement) of the neighborhood task, the neighborhood task acquisition unit 55 notifies the score updating unit 56 as such.

The score updating unit 56 updates the scores stored in the score storage unit 43 in accordance with the status of achievement of the internally created tasks and the externally created tasks in the game terminal 12, the status of scout and encouragement of the externally created tasks, and the status of acknowledgment of scout and encouragement of the published internally created tasks. More specifically, each time the status of achievement of an internally created task is updated from "unachieved" to "achieved" in the task storage unit 41, the task achievement score of task type "A" is incremented. Further, each time the status of achievement of an externally created task is updated from "unachieved" to "achieved" in the task storage unit 41, the task achievement score of task type "B" is incremented.

When an externally created task is imported to (scouted by) the game terminal 12, i.e., when a user account different from the user account of the host terminal is newly registered in the task data in the task storage unit 41, the SP is incremented. When a notification that an externally created task should be supported (encouraged) is given from the neighborhood task acquisition unit 55, the SP is incremented. Irrespective of whether an externally created task is scouted or encouraged, the score updating unit 56 transmits information indicating that the task is scouted or encouraged (hereinafter, also referred to as "scout notification") to the server 14 along with the task ID of that externally created task.

Further, when information indicating that an internally created task published by the user is scouted or encouraged by another user (hereinafter, also referred to as "notification of being scouted") is received from the server 14, the SP is incremented.

The special benefit granting unit 57 periodically refers to the scores stored in the task storage unit 41 when a predetermined period of time (e.g., 24 hours) has elapsed and grants a special benefit determined by values (high-low) of the scores to the user. More specifically, the special benefit granting unit 57 causes a character of type and level determined by the SP score, task achievement score of task type "A", and task achievement score of task type "B" to present itself in the game. For example, the game data in the game data storage unit 44 may be updated so that the character determined by the scores present itself as a friend character. The special benefit granting unit 57 clears the scores stored in the task storage unit 41 after the process of granting a special benefit is completed.

The game execution unit 58 refers to the game data storage unit 44 and runs a game in which the character granted by the special benefit granting unit 57 to the user presents itself and battles an opponent character. The game execution unit 58 stores image data indicating the result of running the game (e.g., battle details or win/loss) in the game data storage unit 44. When an operation of requesting the game to be displayed is detected, the game display control unit 59 causes the display device 68 to display image data indicating the result of running the game stored in the game data storage unit 44.

FIG. 14 is a block diagram of the functional details of the server 14. The server 14 includes a task storage unit 102, a task registration acknowledging unit 104, a search request acknowledging unit 106, a search processing unit 108, a search result providing unit 110, a scout notification acknowledging unit 112, a task updating unit 114, and a scout notification transferring unit 116.

The task storage unit 102 stores data for tasks uploaded from the game terminal 12. FIGS. 15A and 15B show the configuration of task data stored in the task storage unit 102. In practice, the data items of both FIG. 15A and 15B are stored in a single record. The data item of FIG. 15A is identical to that of FIG. 13 so that a description is omitted.

The field for assignment position in FIG. 15B contains an address indicated by the positional information included in a task registration request. As already described, the address could be either at a granularity of towns and blocks (designation of the current position or a landmark) or at a granularity of cities, wards, towns, and villages (designation of an arbitrary position). The field for scout count contains the number of times that the task is imported by users different from the user uploading the task. The field for encouragement count contains the number of times that the task is encouraged by users different from the user uploading the task.

Referring back to FIG. 14, the task registration acknowledging unit 104 acknowledges from the game terminal 12 a request to register a task including task data that should be published and positional information, and stores the task data and the positional information in the task storage unit 102.

The search request acknowledging unit 106 acknowledges a request for searching for neighborhood tasks from the game terminal 12. It will be assumed that the user account of the requesting user is designated in the search request. The search processing unit 108 identifies a range of neighborhood around the current position of the game terminal 12 indicated by the positional information designated in the search request. For example, a circular area of a radius of 5 km around the current position of the game terminal 12 is identified as a range of neighborhood, and the search processing unit 108 identifies a plurality of addresses (e.g., AAA-cho, 1-choume, BBB-cho, 2-choume) belonging to the range of neighborhood. The search processing unit 108 searches the task data stored in the task storage unit 102 for task data in which a user account different from the user account of the user requesting the search is defined and in which the address of the position at which the task is assigned matches an address belonging to the neighborhood range. The search processing unit 108 extracts tasks that hit the criteria as neighborhood tasks.

The search result providing unit 110 transmits list information including the titles of neighborhood tasks, user accounts, task ID, scout counts, and encouragement counts of the neighborhood tasks to the game terminal 12 and causes the list information to be displayed. When an address at a granularity of cities, wards, towns, and villages is defined for the position at which a task is assigned, the task is extracted as a neighborhood task given that the neighborhood range includes a part of cities, wards, towns, and villages.

The search request acknowledgment unit 106 is also configured to acknowledge a request for detailed information designating the ID of a particular task from the game terminal 12. The search processing unit 108 extracts, from the task storage unit 102, detailed task data including a comment and scheduled execution date and time, using the task ID as a key. The search result providing unit 110 transmits the extracted detailed task data to the game terminal 12 and causes the detailed task data to be displayed.

The scout notification acknowledging unit 112 acknowledges a scout notification designating the ID of a particular task from the game terminal 12. When the scout notification indicates that the task is scouted, the task updating unit 114 increments the scout count for the task data stored in the task storage unit 102 and identified by the ID. When the scout notification indicates that the task is encouraged, the task updating unit 114 increments the encouragement count for the task data stored in the task storage unit 102 and identified by the ID.

The scout notification transferring unit 116 refers to the task data stored in the task storage unit 102 and identified by the ID to identify the game terminal 12 to which the scout notification should be destined in accordance with the user account defined in the task data. The scout notification transferring unit 116 transfers the scout notification acknowledged by the scout notification acknowledging unit 112 to the identified game terminal 12, indicating the scout notification as a notification of being scouted.

Figure 16:
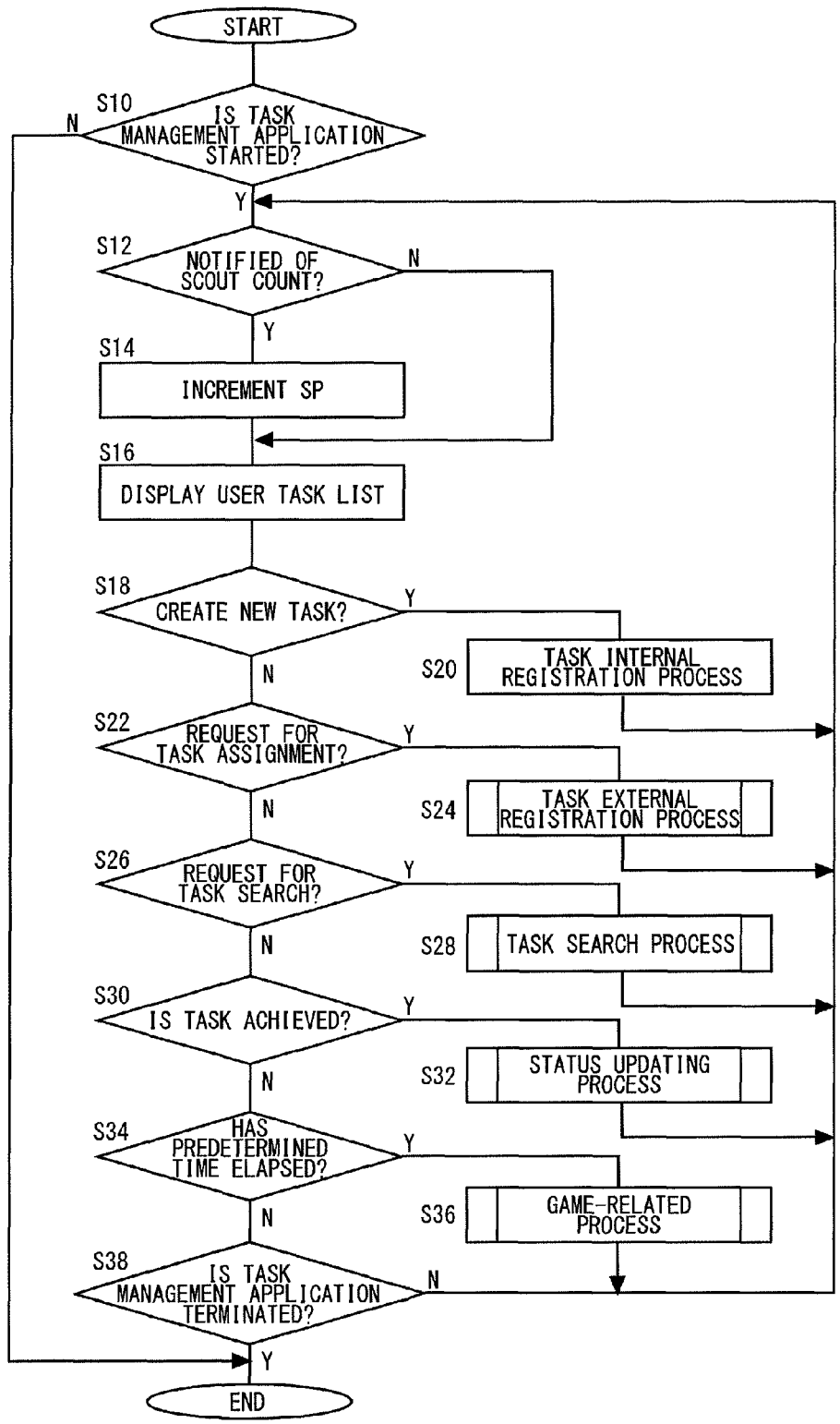
FIG. 16 is a flowchart showing the operation of the game terminal.

A description will now be given of the operation of the game terminal 12 and the server 14 having the above-described configurations. FIG. 16 is a flowchart showing the operation of the game terminal 12. When the user starts the task management application in the game terminal 12 (Y in S10), the following steps of task management process are executed. When the task management application is not started (N in S10), the following steps are skipped and the flow of the figure is terminated.

When a scouted notification is acknowledged from the server 14 (Y in S12), the score updating unit 56 increments the SP stored in the score storage unit 43 (S14). When a scouted notification is not acknowledged (N in S12), S14 is skipped. The task information display control unit 50 causes the user task list to be displayed (S16). When the user selects registration of a new task (Y in S18), the task editing supporting unit 51 causes the task creation screen to be displayed. The internal registration unit 52 registers the internally created task in the storage unit 41 in accordance with the information entered by the user in the task creation screen (S20). When the user requests publication of a particular task (N in S18, Y in S22), a task external registration process described later is executed for the task (S24). When the user requests a search for neighborhood tasks (N in S22, Y in S26), a task searching process described later is executed (S28).

When the user designates achievement of a particular task (N in S26, Y in S30), a status updating process described later is executed for the task (S32). When a predetermined period of time has elapsed since the previous execution of a game-related process described later (N in S30, Y in S34), the game-related process is executed (S36). When the user terminates the task management application (N in S34, Y in S38), the flow of the figure is terminated. When the execution of the task management application is continued (N in S389), or when S20, S24, S28, S32, or S36 is completed, control is returned to S12.

When a request to display the result of executing the game is acknowledged from the user in the game terminal 12, the game display control unit 59 causes image data indicating the result of executing the game stored in the game data storage unit 44 to be displayed (not shown in FIG. 16).

Figure 17:
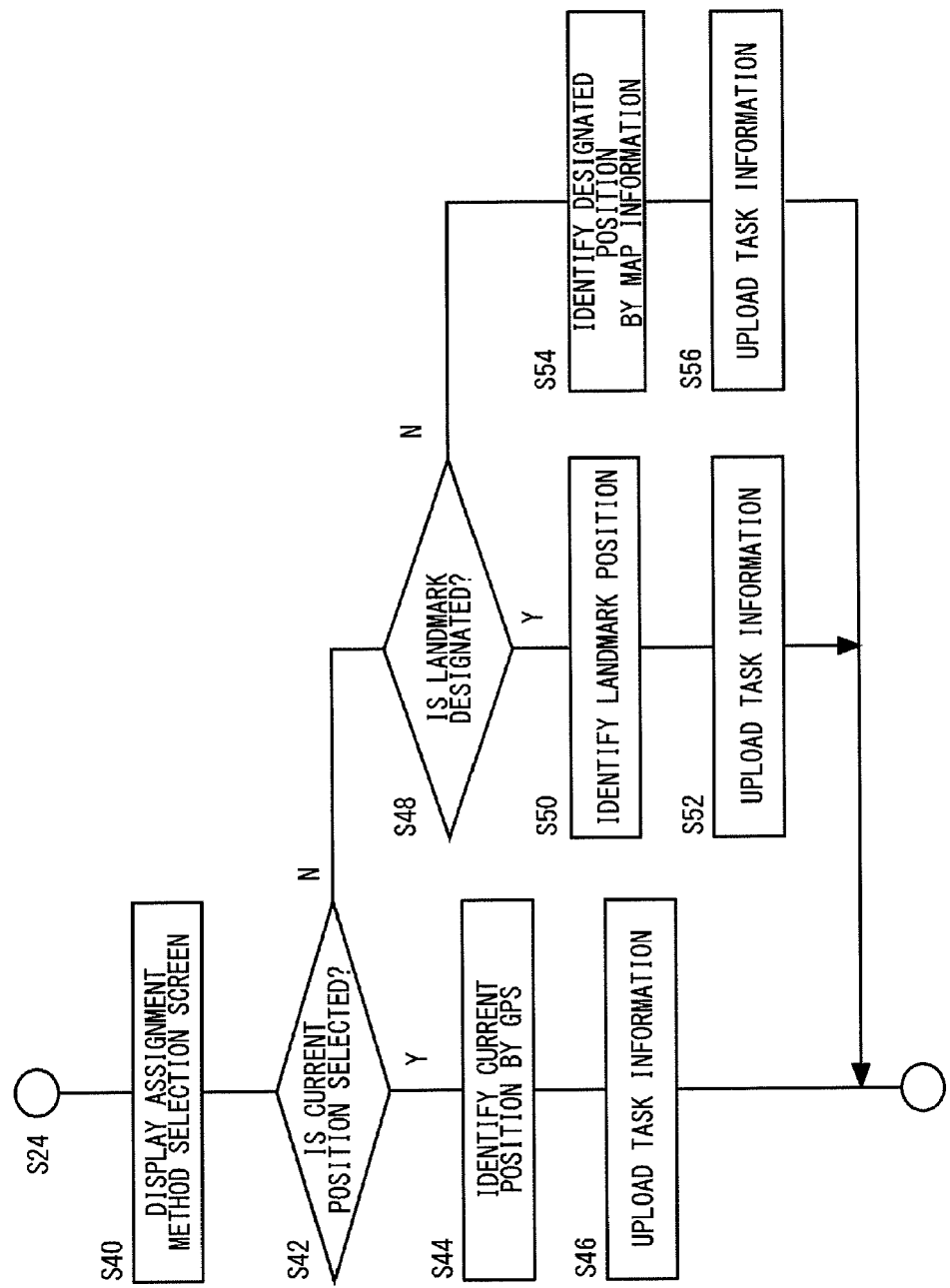
FIG. 17 is a flowchart showing the task external registration process of S24 of FIG. 16 in further detail.

FIG. 17 is a flowchart showing the task external registration process of S24 of FIG. 16 in further detail. The task publication supporting unit 53 causes a screen for selecting a method of assigning a task to be displayed (S40). When a selection is made to assign the task at the current position in the selection screen (Y in S49), the current position acquisition unit 47 identifies the address of the current position of the game terminal 12 at a relatively fine granularity in accordance with the longitude and latitude output from the GPS receiving unit 60. The task publication supporting unit 53 determines the address as a position at which the task is assigned (S44). The external registration unit 54 uploads the positional information indicating the address of the current position of the game terminal 12 to the server 14 along with the task data that should be published (S46).

When a selection is made that the user manually designates a position to assign the task (N in S42), the task publication supporting unit 53 causes the assignment position designation screen including a map image. When the user designates a landmark located on the map image in the assignment position designation screen (Y in S48), the task publication supporting unit 53 identifies the address of the location of the landmark at a relatively fine granularity in accordance with the positional information of the landmark stored in the map information (S50). The external registration unit 54 uploads the positional information indicating the address of the location of the landmark to the server 14 along with the task data that should be published (S52). When the user designates a position at which no landmarks are located in the assignment position designation screen (N in S48), the task publication supporting unit 53 identifies the address of the position designated by the user at a relatively coarse granularity in accordance with the address information of points on the map image stored in the map information (S54). The external registration unit 54 uploads the positional information indicating the address of the position designated by the user to the server 14 along with the task data that should be published (S56).

Figure 18:
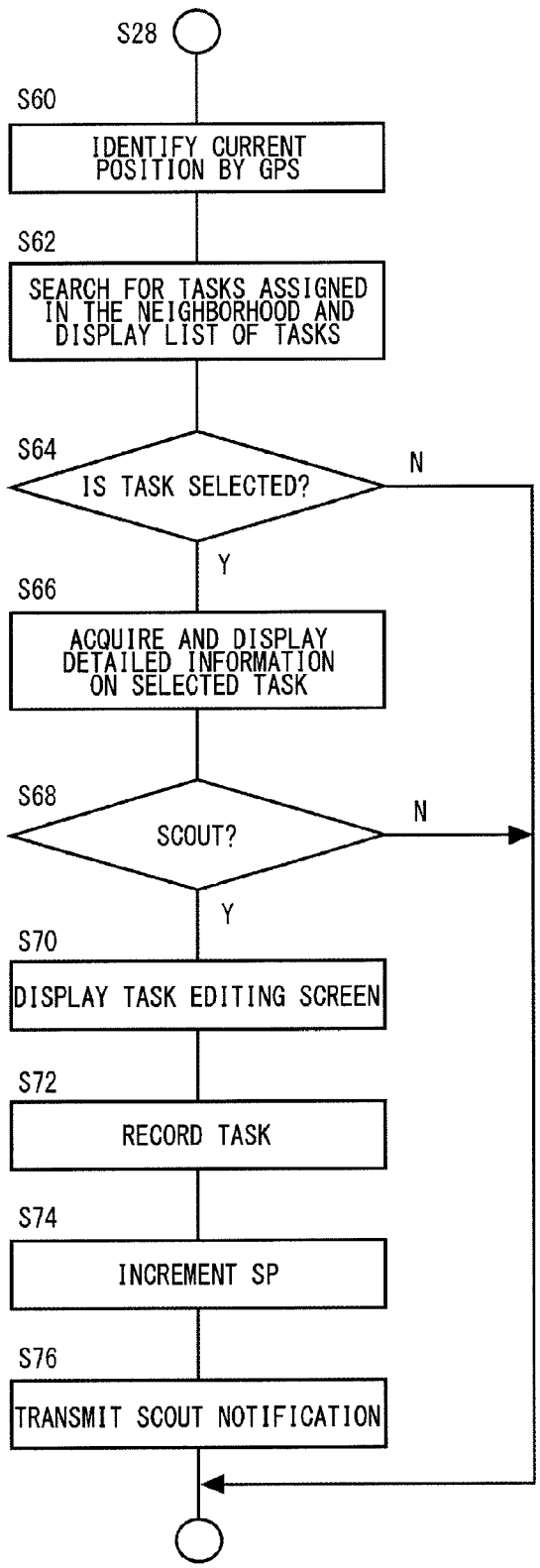
FIG. 18 is a flowchart showing the task search process of S28 of FIG. 16 in further detail.

FIG. 18 is a flowchart showing the task search process of S28 of FIG. 16 in further detail. The current position acquisition unit 47 identifies the address of the current position of the game terminal 12 at a relatively fine granularity in accordance with the longitude and latitude output from the GPS receiving unit 60 (S60). The neighborhood task acquisition unit 55 acquires information on the neighborhood tasks assigned in the neighborhood of the current position of the game terminal 12 from the server 14 and causes the neighborhood list to be displayed (S62). When a particular neighborhood task is selected by the user (Y in S64), the neighborhood task acquisition unit 55 acquires the detailed information on the neighborhood task from the server 14 and causes the detailed information to be displayed (S66). When the user designates that the neighborhood task should be imported, i.e., scouted, as the user's own task (Y in S68), the task editing supporting unit 51 causes the task editing screen for editing the content of the scouted task to be displayed (S70).

When registration of the task is requested in the task editing screen, the internal registration unit 52 records the result of editing in the task editing screen in the task storage unit 41 as an externally created task (S72). The score updating unit 56 increments the SP stored in the score storage unit 43 (S74) and transmits a scout notification to the server 14 (S76). Absent a request for scouting the task (N in S68), S70 and the subsequent steps are skipped. When designation of a particular task by the user in the neighborhood task list is not detected (N in 64), S66 and the subsequent steps are skipped. When encouragement of the task is selected in the screen showing the detailed information of a neighborhood task, S74 and S76 are executed (not shown in FIG. 18).

Figure 19:
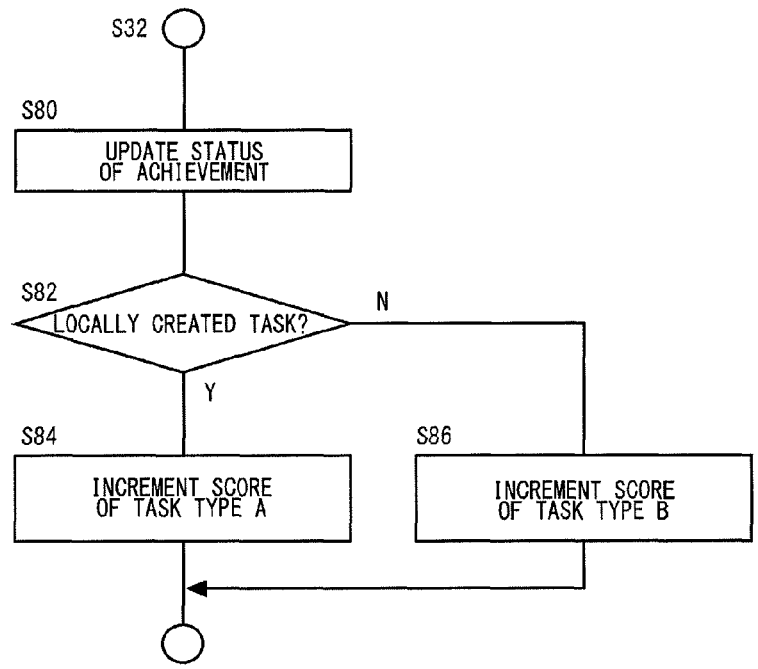
FIG. 19 is a flowchart showing the status updating process of S32 of FIG. 16 in further detail.

FIG. 19 is a flowchart showing the status updating process of S32 of FIG. 16 in further detail. The task information display control unit 50 updates the display of the status of achievement of the tasks in the user task list and updates the task data in the task storage unit 41 from "unachieved" to "achieved" (S80). When the achieved task is an internally created task (Y in S82), the score updating unit 56 increments the task achievement score of task type "A" (S84). Meanwhile, when the achieved task is an externally created task (N in S82), the score updating unit 56 increments the task achievement score of task type "B" (S86).

Figure 20:
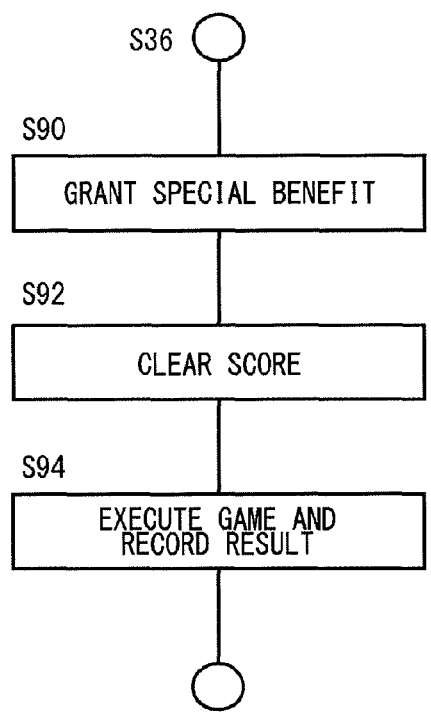
FIG. 20 is a flowchart showing the game-related process of S36 of FIG. 16 in further detail.

FIG. 20 is a flowchart showing the game-related process of S36 of FIG. 16 in further detail. The special benefit granting unit 57 determines whether to grant a special benefit of the game in accordance with the score of respective attributes stored in the score storage unit 43. To grant a special benefit, the special benefit granting unit 57 determines the type of a special benefit and updates the game data in the game data storage unit 44 so that a special benefit is provided to the user in the game (S90). The special benefit granting unit 57 clears the score of respective attributes stored in the score storage unit 43 (S92). The game execution unit 58 executes the game application in accordance with the game data in the game data storage unit 44. In addition, the game execution unit 58 records image data indicating the result of executing the game and stores the data in the game data storage unit 44 (S94).

Figure 21:
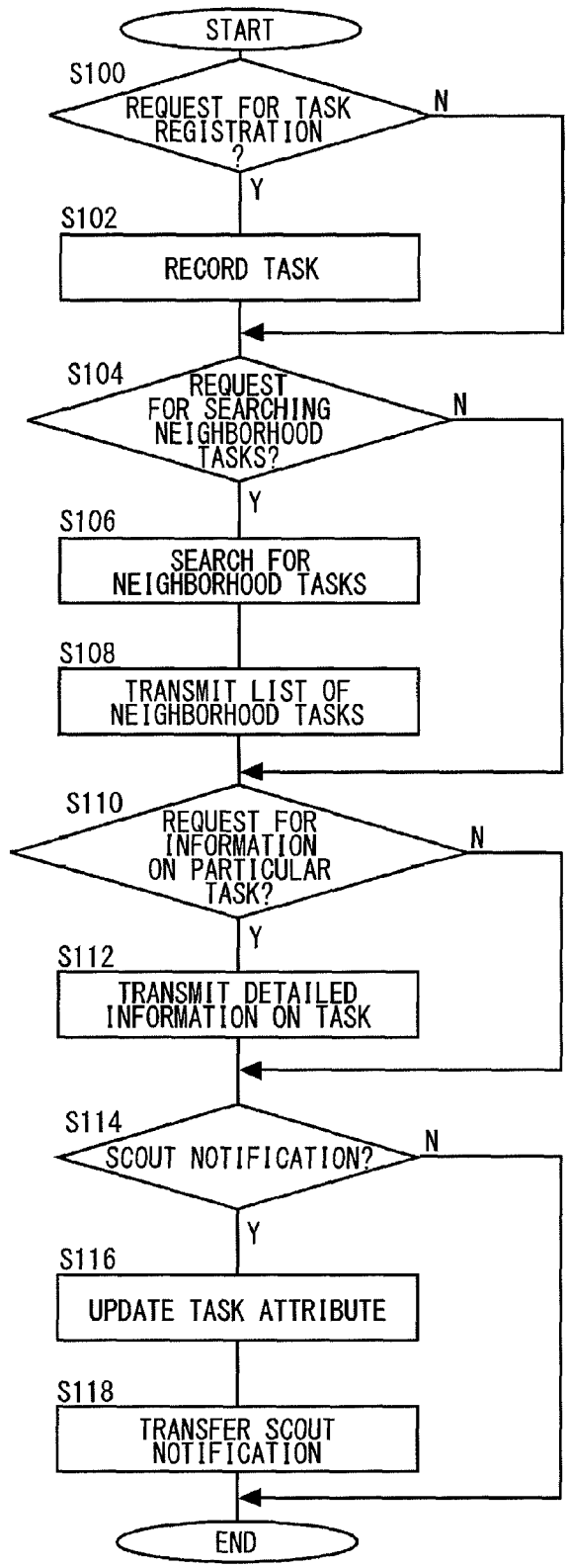
FIG. 21 is a flowchart showing the operation of the server.

FIG. 21 is a flowchart showing the operation of the server 14. When the task registration acknowledging unit 104 acknowledges a request to register a task from the game terminal 12 (Y in S100), the unit 104 stores the data for the task in the task storage unit 102 (S102). When a request to register a task is not acknowledged (N in S100), S102 is skipped. When the search request acknowledging unit 106 acknowledges a request to search for neighborhood tasks from the game terminal 12 (Y in S104), the search processing unit 108 searches the task storage unit 102 for neighborhood tasks assigned in the neighborhood of the current position of the game terminal 12 (S106). The search result providing unit 110 transmits information indicating a list of the neighborhood tasks to the game terminal 12 (S108). When a request to search for neighborhood tasks is not acknowledged (N in S104), S106 and S108 are skipped.

When the search request acknowledging unit 106 acknowledges a request to seek information on a particular neighborhood task from the game terminal 12 (Y in S110), the search processing unit 108 acquires the detailed information on the neighborhood task from the task storage unit 102. The search result providing unit 110 transmits the detailed information on the neighborhood task to the game terminal 12 (S112). When a request to seek information on a particular neighborhood task is not acknowledged (N in S110), S112 is skipped. When the scout notification acknowledging unit 112 acknowledges a scout notification from the game terminal 12 (Y in S114), the task updating unit 114 increments the scout count or the encouragement count of the scouted or encouraged task (S116). The scout notification transferring unit 116 transmits the scout notification to the game terminal 12 originating the scouted or encouraged task, as a notification of being scouted (S118). Absent a scout notification (N in S114), S116 and S118 are skipped.

According to the task management system of the embodiment, the user uploading positional information from the game terminal 12 to a server on a network along with data is capable of selecting whether to configure the positional information as the address of the current position of the game terminal 12 or the address of a position arbitrarily designated by the user on a map image of a scale displayed on the game terminal 12. This can increase the flexibility of the content defined as positional information under constraints on system resources in the game terminal 12 as a mobile information terminal. For example, where the current position of the game terminal 12 is represented by an address at a relatively fine granularity and the position arbitrarily designated by the user on a map image is at a relatively coarse granularity, the user can determine which positional information should be selected depending on the nature of data to which the positional information is added.

The size of a display device of a mobile information terminal such as the game terminal 12 is generally small. Further, due to the constraints on system resources in mobile information terminals described above, it is difficult to reduce the scale of a map displayed on the display device. Therefore, if the position designated by the user on a map image is strictly identified, i.e., identified as a relatively small spot, user convenience will be lost as a result. For example, the user may wish to designate AAA-cho, 1-choume but the position pointed to on the map image is detected as being AAA-cho, 2-choume contrary to the user's intent. In other cases, the user may be forced to designate a position from scratch. According to the embodiment, when the user points to a position on a map image, the address corresponding to the point is identified at a relatively coarse granularity (e.g., granularity of AAA-cho), i.e., identified as a relatively large area. Therefore, loss of user convenience is mitigated.

In further accordance with the task management system 10, a landmark located in advance on a map image as positional information can be designated by the user. Generally, the position of a landmark is likely to be designated as positional information. Further, since the number of positions that can be designated by the user on a map image>>the number of landmarks, an address at a relatively fine granularity can be designated as positional information even under constraints on system resources in the game terminal 12. This can efficiently improve the flexibility of the content defined as positional information.

In further accordance with the task management system 10, a task created by the user of the game terminal 12a can be published to other users (e.g., the users of the game terminals 12b-12d). If any of the other users of the game terminals 12b-12d considers that the task created by the user of the game terminal 12a is useful, the other user can import the task as his or her own task. For example, even when the user of the game terminal 12b forgets the date and time of broadcast of a drama, he or she can remember the date and time of broadcast by seeing the task of recording the drama published by the game terminal 12a. Importing the task as the importing user's own task also helps ensure that the action of recording the drama is taken without fail, for example.

In further accordance with the task management system 10, the content of a task created by the first user and imported by the second user can be edited to suit the convenience of the second user. This improves the convenience of a user who imports a task created by another user.

In further accordance with the task management system 10, the user of the game terminal 12 can confirm the content of a task created by another user and published by designating a position in the neighborhood of the current position of the game terminal 12. Often, the task published at a position in the neighborhood of the current position of the game terminal 12 is also useful to the user of the game terminal 12. For example, when a task of "going to newly opened ABC restaurant" is published in the neighborhood of the restaurant, users in the neighborhood of the restaurant can recognize the existence of newly opened ABC restaurant by confirming the task.

In further accordance with the task management system 10, a user who imports or supports an externally created task is granted a special benefit in the form of an SP that determines the level of a character. Similarly, a user who has a published internally created task imported or supported by another user is also granted an SP. This promotes exchanges via interactions between multiple users related to tasks.

In further accordance with the task management system 10, different types of special benefits are granted to a user when an internally created task is achieved in the game terminal 12 and when an externally created task is achieved. It is therefore necessary not only to achieve an internally created task but also to achieve an externally created task in order to complete the collection of multiple types of special benefits. This can promote exchange via interactions between multiple users related to tasks.

Described above is an explanation based on an exemplary embodiment. The embodiment is intended to be illustrative only and it will be obvious to those skilled in the art that various modifications to constituting elements and processes could be developed and that such modifications are also within the scope of the present invention. A description will now be given of variations.

A description will be given of the first variation. In the embodiment described above, it is assumed that the data for a map image is stored in the map storage unit 42 of the game terminal 12. In this variation, the server 14 may store the data for a map image. When the game terminal 12 should display the assignment position confirmation screen or the assignment position designation screen, the server 14 may provide the data for a map image to the game terminal 12 as the need arises. However, due to the constraints on system resources such as restriction on bandwidth available for communication between the game terminal 12 and the server 14, restriction on the amount of memory in the game terminal 12, etc. it is difficult, also in this variation, to provide a map image of a fine scale to the game terminal 12 for display or define addresses at a fine granularity in association with positions on the map image. Therefore, the granularity of addresses defined in the data for a map image will be relatively coarse (cities, wards, towns, and villages) also in this variation.

A description will be given of the second variation. The user of the game terminal 12 may designate a range of searching for neighborhood tasks (not mentioned in the embodiment). For example, the user may select from a plurality of ranges including ranges of having a radius of 500 m, 2 Km, 5 Km, etc. The neighborhood task acquisition unit 55 of the game terminal 12 transmits to the server 14 a request for searching for neighborhood tasks including a user-designated range of searching for neighborhood tasks. The search processing unit 108 of the server 14 may extract neighborhood tasks from the task storage unit 102, defining the range of searching for neighborhood tasks designated in the search request as a range of neighborhood. According to this variation, the user can easily identify neighborhood tasks by adjusting the range of search in accordance with the current position of the game terminal 12.

A description will be given of the third variation. In the embodiment described above, it is assumed that positional information is added to a task created by the user of the game terminal 12 and uploaded from the game terminal 12 to the server 14. It should of course be noted that positional information may not necessarily be added to a task but also to other data. A skilled person would understand that the technical idea of the present invention can be applied to transmission of any data to which positional information is added from a mobile information terminal such as the game terminal 12 to the server 14. Of course, the data uploaded from one game terminal 12 to the server 14 and downloaded by another game terminal 12 from the server 14 may not necessarily be a task. For example, an announcement, diary, monologue, tweet, etc. may be uploaded or downloaded. In other words, any information that the user of one game terminal 12 should share with the user of another game terminal 12 may be uploaded or downloaded.

A description will be given of the fourth embodiment. The task publication supporting unit 53 may include an arbitrary position acquisition unit configured to acquire, when a particular position on a map image is tapped in the assignment position designation screen (e.g., FIG. 6), positional information indicating the address mapped to the tap position at a granularity of towns and blocks from the map storage unit 42. The task publication supporting unit 53 causes the positional information acquired by the arbitrary position acquisition unit in the assignment position confirmation screen (e.g., FIG. 7). The technical idea of the present invention can also be embodied in the structures listed below in the addendum.

(Addendum 1)

A mobile information terminal comprising:

a first position acquisition unit configured to acquire a current position of the terminal;

a second position acquisition unit configured to acquire a position on a map designated by a user;

an acknowledging unit configured to acknowledge user designation of whether positional information indicating the current position of the terminal acquired by the first acquisition unit or position indicating the position on the map acquired by the second position acquisition unit should be added to data that should be stored in an external server along with the positional information; and a transmitting unit configured to transmit the data to which the positional information is added to the server.

(Addendum 2)

The mobile information terminal according to addendum 1, further comprising a touch panel, wherein the second position acquisition unit acquires a position on a map mapped to a touched position on the touch panel.

(Addendum 3)

The mobile information terminal according to addendum 1 or addendum 2, wherein the first position acquisition unit acquires information indicating the current position of the terminal at a relatively fine granularity, and wherein the second position acquisition unit acquires information indicating the position on the map designated by the user at a relatively coarse granularity.

Any combination of the embodiment and a variation will also be useful as an embodiment of the present invention. A new embodiment created by a combination will provide the combined advantages of the embodiment and the variation as combined.

It will be understood to a skilled person that the functions achieved by the constituting elements recited in the claims are implemented either alone or in combination by the constituting elements shown in the embodiment and the variation.

What is claimed is:

1. An information processing system comprising a first mobile information terminal, a second mobile information terminal, and a server,
    wherein the first mobile information terminal comprises:
    a current position acquisition unit configured to acquire a current position of the terminal;
    an acknowledging unit configured to acknowledge user designation of whether positional information indicating a position arbitrarily designated by a user on a scaled map displayed on the terminal or positional information indicating the current position of the terminal acquired by the current position acquisition unit is to be added to data to be stored in the server along with the positional information; and
    a transmitting unit configured to transmit to the server the data to which user designated positional information is added,
    wherein the server includes a storage unit configured to store the data transmitted from the first mobile information terminal along with the positional information,
    wherein the data represents information that the user of the first mobile information terminal shares with a user of the second mobile information terminal, and
    wherein the second mobile information terminal includes an acquisition unit configured to acquire from the server the information to be shared, to which positional information indicating a neighborhood of the current position of the terminal is added.

2. The information processing system according to claim 1, wherein the acknowledging unit of the first mobile information terminal is further capable of acknowledging, as positional information, user designation of a landmark mapped to a particular position on the map image, and wherein, when a landmark is designated as positional information, the storage unit stores the data along with the positional information on the landmark.

3. The information processing system according to claim 1, wherein the server further comprises a notification unit configured to inform, when the second mobile information terminal acquires the information to be shared, the first mobile information terminal of information related to acquisition of the information to be shared, and
    wherein the first mobile information terminal further comprises a special benefit granting unit configured to grant, when the information related to acquisition of the information to be shared is communicated, a special benefit to the user.

4. The information processing system according to claim 1, wherein the information to be shared is information indicating a task of the user of the first mobile information terminal, and
    wherein the second mobile information terminal further comprises a task management unit configured to record the task acquired from the server as a task of the user of the second mobile information terminal.

5. The information processing system according to claim 4, wherein the task management unit of the second mobile information terminal presents the content of the task acquired from the server to the user of the second mobile information terminal in a mode in which the content can be edited.

6. The information processing system according to claim 4, wherein the task management unit of the second mobile information terminal manages whether tasks created in the second mobile information terminal and tasks acquired from the server are executed by the user of the second mobile information terminal, and
    wherein the second mobile information terminal further comprises a special benefit granting unit configured to grant different special benefits to the user, depending on whether a task created in the second mobile information terminal is executed or a task acquired from the server is executed.

7. A mobile information terminal comprising:
    a current position acquisition unit configured to acquire a current position of the terminal;
    an acknowledging unit configured to acknowledge user designation of whether positional information indicating a position arbitrarily designated by a user on a scaled map displayed on the terminal or positional information indicating the current position of the terminal acquired by the current position acquisition unit is to be added to data to be stored in an external server along with the positional information; and
    a transmitting unit configured to transmit to the server the data to which user designated positional information is added,
    wherein the server includes a storage unit configured to store the data transmitted from the terminal along with the positional information,
    wherein the data represents information that the user of the terminal shares with a user of a second mobile information terminal, and
    wherein the second mobile information terminal includes an acquisition unit configured to acquire from the server the information to be shared, to which positional information indicating a neighborhood of the current position of the terminal is added.

8. A computer program embedded on a non-transitory computer-readable recording medium, comprising:

a current position acquisition module configured to acquire a current position of a terminal;

an acknowledging module configured to acknowledge user designation of whether positional information indicating a position arbitrarily designated by a user on a scaled map displayed on the terminal or positional information indicating the current position of the terminal acquired by the current position acquisition module is to be added to data to be stored in an external server along with the positional information; and a transmitting module configured to transmit to the server the data to which user designated positional information is added, wherein the server includes a storage unit configured to store the data transmitted from the terminal along with the positional information, wherein the data represents information that the user of the terminal shares with a user of a second terminal, and wherein the second terminal includes an acquisition unit configured to acquire from the server the information to be shared, to which positional information indicating a neighborhood of the current position of the terminal is added.

9. A server adapted to store data along with positional information, comprising:

an acknowledging unit configured to acknowledge, from an external mobile information terminal, data to which is added positional information indicating a position arbitrarily designated by a user on a scaled map displayed on the terminal or positional information indicating the current position of the terminal, according to user selection; and a storage unit configured to store the acknowledged data along with the positional information, wherein the data represents information that the user of the terminal shares with a user of a second terminal, and wherein the second terminal includes an acquisition unit configured to acquire from the server the information to be shared, to which positional information indicating a neighborhood of the current position of the terminal is added.

10. An information processing method comprising:

acquiring, using a mobile information terminal, a current position of the terminal;

acknowledging, using the mobile information terminal, user designation of whether positional information indicating a position arbitrarily designated by a user on a scaled map displayed on the terminal or positional information indicating the current position of the terminal is to be added to data to be stored in an external server along with the positional information; and transmitting to the server, using the mobile information terminal, the data to which user designated positional information is added;

storing, using the server, the data transmitted from the mobile information terminal along with the positional information, wherein the data represents information that the user of terminal shares with a user of a second terminal, and wherein the second terminal acquires, from the server, the information to be shared, to which positional information indicating a neighborhood of the current position of the terminal is added.

\* \* \* \* \*